(12) United States Patent
Haataja et al.

(10) Patent No.: US 8,538,691 B2
(45) Date of Patent: Sep. 17, 2013

(54) DATA TRANSFER

(75) Inventors: Jarkko Haataja, Tuuliviirinkuja (FI); Urpo Niemelä, Kangaskontiontie (FI); Tero Posio, Hämäläntie (FI)

(73) Assignee: Polar Electro Oy, Kempele (FI)

( * ) Notice: Subject to any disclaimer, the term of this patent is extended or adjusted under 35 U.S.C. 154(b) by 710 days.

(21) Appl. No.: 12/434,143

(22) Filed: May 1, 2009

(65) Prior Publication Data

US 2009/0278734 A1 Nov. 12, 2009

(30) Foreign Application Priority Data

May 9, 2008 (FI) ..................................... 20085432

(51) Int. Cl.
*G01S 19/49* (2010.01)
(52) U.S. Cl.
USPC .. 701/469; 701/445; 342/357.23; 342/357.32
(58) Field of Classification Search
USPC ................. 701/200, 207, 213, 214, 408, 412, 701/445, 468, 469, 472, 473; 342/357.2, 342/357.23, 357.25, 357.31, 357.32
See application file for complete search history.

(56) References Cited

U.S. PATENT DOCUMENTS

| | | | | |
|---|---|---|---|---|
| 6,002,982 | A | 12/1999 | Fry | |
| 6,292,750 | B1 * | 9/2001 | Lin | 701/472 |
| 6,442,481 | B2 * | 8/2002 | Miller | 701/472 |
| 6,463,385 | B1 * | 10/2002 | Fry | 701/213 |
| 6,496,778 | B1 * | 12/2002 | Lin | 701/470 |
| 6,522,266 | B1 | 2/2003 | Soehren et al. | |
| 6,546,336 | B1 | 4/2003 | Matsuoka et al. | |
| 6,577,921 | B1 * | 6/2003 | Carson | 700/214 |
| 6,801,159 | B2 * | 10/2004 | Swope et al. | 342/357.31 |
| 6,856,934 | B2 | 2/2005 | Vock et al. | 702/149 |
| 6,924,764 | B1 * | 8/2005 | Chen | 342/357.57 |
| 7,254,516 | B2 | 8/2007 | Case et al. | 702/182 |
| 7,848,881 | B2 * | 12/2010 | Tan et al. | 701/207 |
| 7,945,384 | B2 * | 5/2011 | Takaoka et al. | 701/526 |
| 8,068,858 | B2 * | 11/2011 | Werner et al. | 455/456.3 |
| 8,121,785 | B2 * | 2/2012 | Swisher et al. | 701/423 |
| 2002/0177476 | A1 | 11/2002 | Chou | |
| 2008/0046179 | A1 * | 2/2008 | Mackintosh et al. | 701/213 |
| 2010/0198453 | A1 * | 8/2010 | Dorogusker et al. | 701/33 |

FOREIGN PATENT DOCUMENTS

| | | |
|---|---|---|
| DE | 4033831 A1 | 4/1991 |
| WO | WO0142809 A2 | 6/2001 |

OTHER PUBLICATIONS

Mohamed Shaalan, Extended European Search Report for corresponding Finnish application, pp. 1-5, May 19, 2011.

* cited by examiner

*Primary Examiner* — Joseph C Rodriguez
(74) *Attorney, Agent, or Firm* — Hoffmann & Baron, LLP

(57) ABSTRACT

A portable electronic device comprises a controller and a display. The controller receives vector data on a position of a user of the portable device from a satellite positioning sensor associated with the user, and scalar data on movement of the user from at least one motion sensor associated with the user. The controller stores data based on the vector data and feeds a scalar parameter proportional to the scalar data to the display. The display displays the scalar parameter.

11 Claims, 4 Drawing Sheets

DATA TRANSFER

CROSS-REFERENCE TO RELATED APPLICATION

This application claims priority based on Finnish Patent Application No. 20085432, filed May 9, 2008, which is incorporated herein by reference.

BACKGROUND

The invention relates to a portable electronic device with data of at least one motion sensor.

DESCRIPTION OF THE RELATED ART

A portable electronic device, such as a wrist or bike computer, may be used to monitor, for example, a heart rate of a user. The portable device may communicate with an outside motion sensor, such as a stride sensor or a cadence sensor of a vehicle, for determining the speed of the user and/or the traveled distance. In general, the portable device may communicate with several outside motion sensors. In that way, for example a parameter associated with the movement can be proportioned with the heart rate.

The frame of reference for the motion sensors is typically provided by the inertial frame, or in the case of bike sensors, the contact point between the ground and a bike wheel. As a result, the information provided by the motion sensor is rather limited and it is therefore useful to consider improvements in portable electronic devices in this regard.

SUMMARY

An object of the invention is to provide an improved portable electronic device. According to an aspect of the invention, there is provided a portable electronic device. The device comprises a controller and a display, the controller being configured to receive vector data on a position of a user of the portable device from a satellite positioning sensor associated with the user; receive scalar data on movement of the user from at least one motion sensor associated with the user; store data based on the vector data; feed a scalar parameter proportional to the scalar data to the display; and the display is configured to display the scalar parameter.

According to another aspect of the invention, there is provided a data processing method. The method further comprises receiving, by a controller of a portable electronic device, vector data on a position of a user of the portable device from a satellite positioning sensor associated with the user; receiving, by the controller, scalar data on movement of the user from at least one motion sensor associated with the user; storing data based on the vector data; feeding, by the controller, a scalar parameter proportional to the scalar data to the display; and displaying the scalar parameter by the display.

According to another aspect of the invention, there is provided a computer program product encoding a computer program of instructions for executing a computer process for data processing. The computer program product comprises receiving vector data on a position of a user of the portable device from a satellite positioning sensor associated with the user; receiving scalar data on movement of the user from at least one motion sensor associated with the user; storing data based on the vector data; feeding scalar parameter proportional to the scalar data to the display for displaying the scalar parameter.

The invention provides advantages. Data from a separate source can be received to decrease the limitations of the data from motion sensor(s).

BRIEF DESCRIPTION OF THE DRAWINGS

In the following, the invention will be described in greater detail with reference to the embodiments and the accompanying drawings, in which.

DETAILED DESCRIPTION

Figure 1:
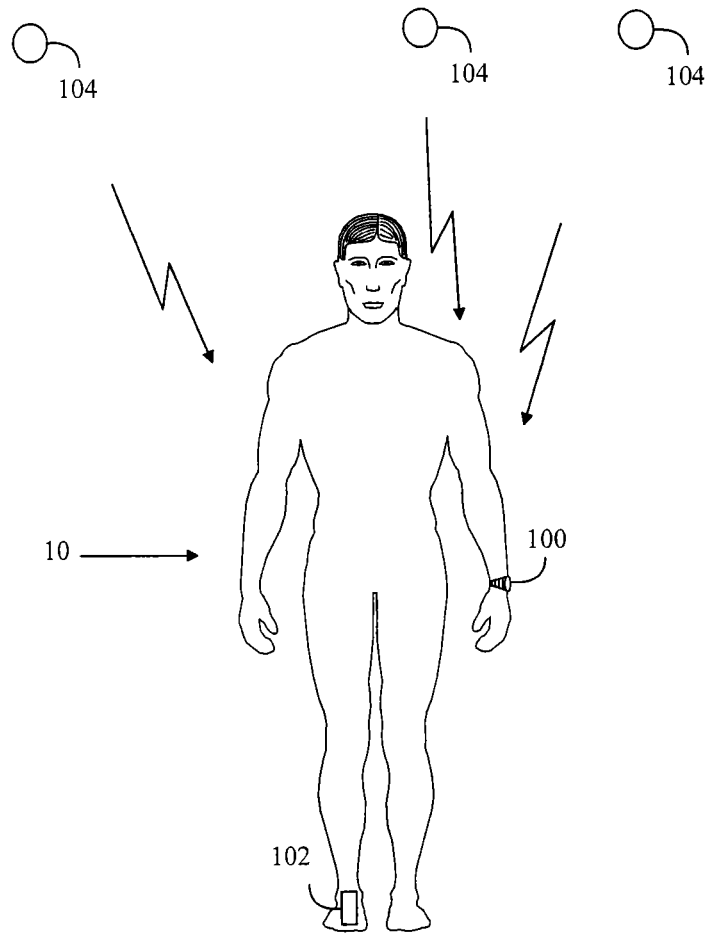
FIG. 1 shows a user with a portable device and a motion sensor.

FIG. 1 presents a user 10 with a portable device 100 and a motion sensor 102. The portable electronic device 100 may be, for instance, a wrist computer. The portable device 100 may simultaneously receive data on signals from satellites 104 of a satellite positioning system and from at least one motion sensor 102 associated with a user 10.

The data on signals from the satellites 104 of a satellite positioning system is vector data on a position of a user 10 and the vector data may come from a satellites 104 of a satellite positioning system directly or indirectly via a separate satellite positioning sensor. The vector data may define the position of the receiver (associated with the user of the portable device 100) of the satellite signals three dimensionally (3D), two dimensionally (2D) or one dimensionally (1D).

Figure 2:
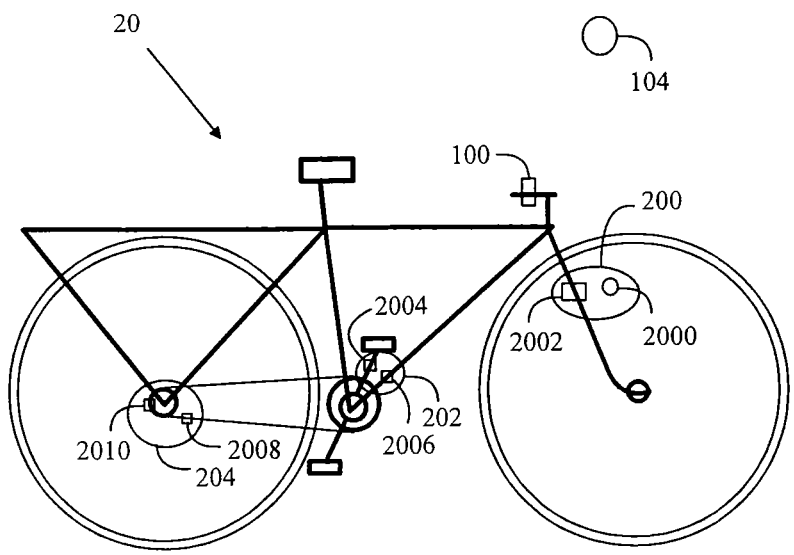
FIG. 2 illustrates a vehicle with a portable device and a motion sensor.

The data from the at least one motion sensor 102 may be scalar data related to movement of the user 10. The scalar data comprises speed or a traveled distance from a predetermined position. The motion sensor 102 may be associated with the user such that the user 10 carries the motion sensor 102 during exercising (FIG. 1) or the sensor may be attached to an exercise equipment such as a bicycle (FIG. 2). The motion sensor 102 may measure a movement caused to the motion sensor 102 by the user 10 of the device 100. The portable device 100 may store data based on the vector data and display a scalar parameter proportional to the scalar data.

The satellite positioning system may be a GPS (Global Positioning System) or the like.

A common factor in motion sensors 102 is that the motion sensor 102 follows the user-fixed coordinate system. Thus, the motion sensor 102 has the same average speed and distance relative to a reference point as the user 10, wherein the reference point is external with respect to the user-fixed coordinate system.

The scalar parameter may be an instantaneous speed, an average speed or a distance between two points along the path of the user. The scalar parameter may be based on a one-dimensional presentation of a speed or distance.

The speed may refer to an overall speed of the body of a user 10 with respect to the environment, for example, during walking, running, cycling, etc. The speed may be an instantaneous speed. An instantaneous speed may be formed without averaging or integration, or the speed may be averaged or integrated over a few seconds, for example.

The portable device 100 may receive scalar data which is displayable speed or distance data or determine a speed or distance of the user 10 on the basis of the received scalar data.

The motion sensor 102 may be, for example, a stride sensor. The stride sensor may be attached to a shoe of the user. When the user is running with the shoe on, the foot experiences acceleration and deceleration cyclically which can be measured inertially by the stride sensor sensitive to the inertial forces. An inertial algorithm, which may be performed in the stride sensor or in the portable device 100, may determine several parameters of the movement of the user 10 one of which may be speed. The stride sensor may transmit signals wirelessly, the signals including scalar data on the speed or distance.

In general, it is considered that the speed and/or distance of the user 10 can be measured more accurately on the basis of the motion sensor(s) than on the basis of the satellite position system. A human being moves rather slowly when he/she is walking or running and a satellite positioning system cannot form, for example, an accurate value for (instant) speed of such a slow movement. Hence in an embodiment, the primary source for the speed of the user 10 is a motion sensor. However, the position information of a motion sensor is rather limited due to the scalar characteristics of the scalar data.

In FIG. 1, the device 100 may determine a speed and/or traveled distance of the user 10 on the basis of at least one of the signals it is receiving. Hence, the data for the speed and/or distance may be based on both the motion sensor 102 and the satellite positioning system or either the motion sensor 102 or the satellite positioning system. After the determination of the speed and/or distance of the user 10, a display of the device 100 may be used to display the speed and/or distance to, for example, the user 10. The determination of the speed and/or distance may include a selection to use either the data on signals from the satellite positioning system or the data on signals from the at least one motion sensor 102. The determination may also include signal and/or data processing.

FIG. 2 presents an embodiment related to an exercise equipment such as a bicycle. The bicycle 20 may have at least one motion sensor 200, 202, 204, and the portable device 100, which may be a bicycle computer, may also be attached to the bicycle 20. The motion sensors 200, 202, 204 may output scalar data. A sensor attached to a bike is also referred to as a bike sensor.

The motion sensor 200 may be a speed sensor which may comprise a magnet 2000 fastened to a wheel of a bicycle or the like, and a detector 2002 in the frame structure (front fork) of the bicycle 20. The speed measurement may be based on detection of the movement of the magnet 2000 past the detector 2002 of the sensor 200. When the circumference of the wheel and the time between two successive detections are known, a speed of the bicycle may be formed, for example, by dividing the circumference by the difference in time of the successive detections. However, the motion sensor 200 may also be an inertia sensor or the like.

Correspondingly, the motion sensor 202 may be a cadence sensor which may measure the pedalling frequency (or another performance frequency of a movement) of a pedaller. Cadence refers to a measure or beat of movement. The cadence sensor may comprise a magnet 2004 fastened to the pedal of a bicycle and a detector 2006 fastened to the frame tube of the bicycle, the measurement of the cadence, i.e. the pedalling frequency, may then be based on detection of the movement of the magnet 2004 past the detector 2006. When the gear ratio and the circumference of the wheel are known, a speed of the bicycle may also be formed, for example, by dividing the circumference multiplied by a constant based on the gear ratio by the difference in time between two successive detections. However, the motion sensor 202 may also be an inertia sensor or the like.

Similarly, the motion sensor 204 may comprise a magnet 2008 fastened to a chain of the bicycle 20 and a detector 2010 fastened to a cogwheel of the bicycle 20. The measurement of this form of cadence may then be based on a detection of the movement of the magnet 2008 past the detector 2010. When the gear ratio and the circumference of the wheel are known, a speed of the bicycle 20, which the user may be riding, may also be formed by dividing the circumference multiplied by a constant based on the gear ratio by the difference in time between two successive detections. However, the motion sensor 204 may also be an inertia sensor or the like.

Figure 3:
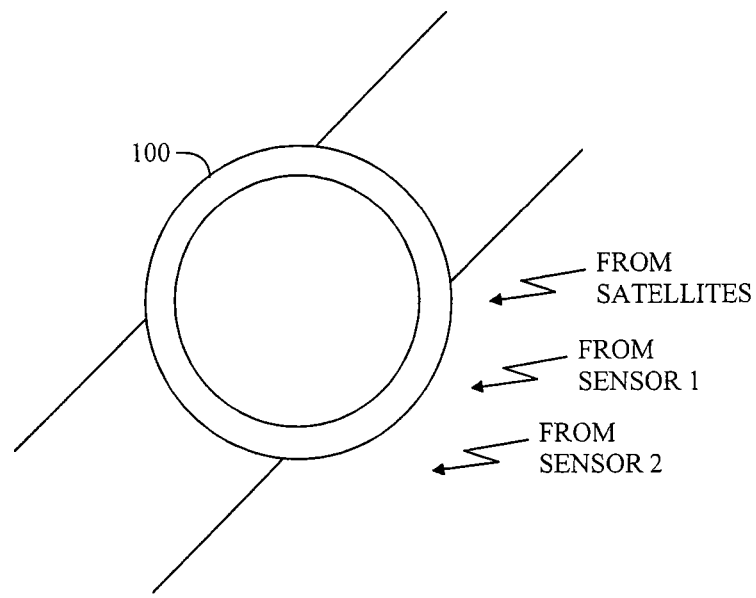
FIG. 3 illustrates a portable device with wireless satellite receiver.

FIG. 3 presents an embodiment where the portable device 100 includes a wireless sensor for generating vector data from satellite signals. In the case of the GPS, each satellite transmits two signals having frequencies between 1 GHz and 2 GHz.

The location based on the vector data may be expressed in global coordinates or in some other coordinates in 3D, 2D or 1D. The vector data may also be transformed into a scalar form, for instance, such that the difference in coordinates of successive measurements is transformed into a distance expressible in meters (or other length units). In order to measure, for example, speed, the distance may be divided by the difference in time of the successive measurements. The portable device 100 may also have a wireless or wired connection with at least one outside motion sensor 102, 200-204 or the like. However, the portable device 100 may additionally or alternatively comprise at least one sensor for determining the overall speed of the user with respect to the environment.

Figure 4:
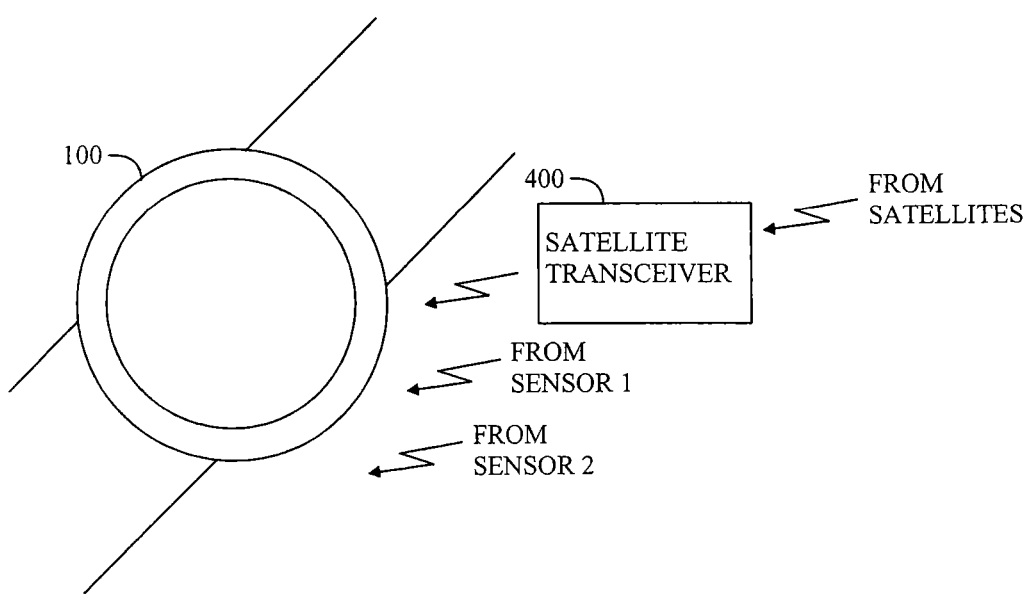
FIG. 4 illustrates a portable device receives signals from a separate satellite transceiver.

FIG. 4 shows an embodiment where the portable device 100 receives a signal from a separate satellite positioning sensor 400 which may be associated with the user of the portable device 100 during exercising. The satellite positioning sensor 400 may determine its position on the globe and may also form data on its speed and/or traveled distance. The portable device 100 may receive signals from the satellite positioning sensor 400 via a wire or wirelessly, and the signals may carry data related to a speed and/or a position of the satellite positioning sensor 400. The portable device 100 may also have a wireless or wired connection with the at least one outside motion sensor 102, 200-204 or the like.

The portable device 100 may display the speed and/or distance of the user based on data on at least one signal of the at least one motion sensor while receiving data on signals from both the satellite positioning system and the at least one motion sensor 102, 200-204. In an embodiment, a scalar parameter indicating the speed and/or traveled distance on the basis of the data from only one motion sensor may be displayed.

The portable electronic device 100 may lose the signal from the motion sensor(s) 102, 200-204. The loss may be caused by any reason, such as drainage or a loss of contact of a battery in the sensor or the transceiver, breakdown of a component or an electric circuit, interference, fading etc. Whatever the reason, the portable device 100 cannot in such a situation operate using only the motion sensor(s). In prior art, the user has to face a fatal loss of important information on his/her training.

Figure 5:
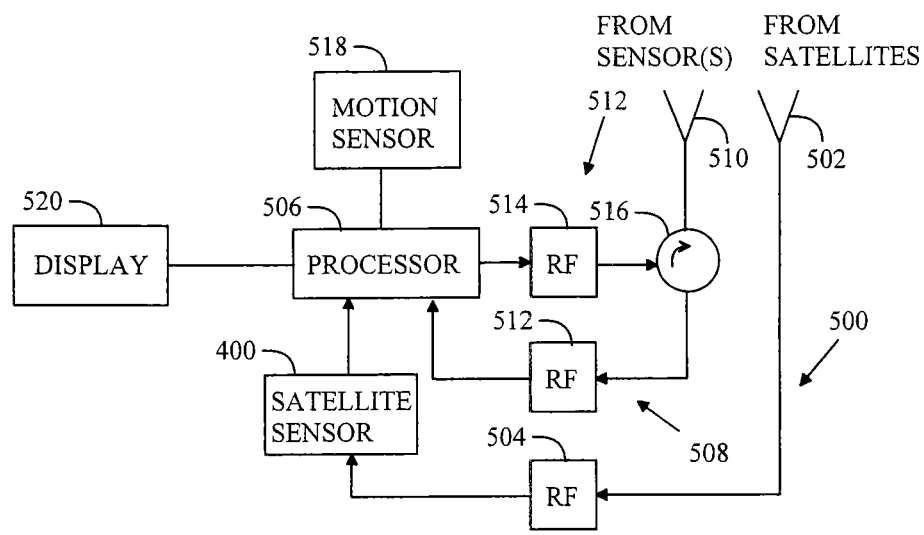
FIG. 5 illustrates a block diagram of a portable device.

FIG. 5 shows a block diagram of the portable device. A controller 506 may detect a failure to receive the scalar data from the at least one motion sensor 102, 200, 202, 204, 518. In response to the failure, the controller 506 may switch to form a scalar parameter associated to the user 10 on the basis of the vector data received from a satellite positioning sensor 400. The controller 506 may then feed the formed the scalar parameter to the display 520. The display 520 may display the scalar parameter of the user 10. The scalar parameter may be a numerical value for the speed and/or distance of the user 10 and thus directly define the speed and/or distance of the user 10.

In the case of failure in reception, the controller 506 may alternatively receive scalar data on movement of the user 10 from the satellite positioning sensor 400 as a response to the failure. The controller 506 may then feed a scalar parameter based on the scalar data from the satellite positioning sensor 400 to the display 520. The scalar data from the satellite positioning sensor 400 may be a directly displayable scalar parameter or the controller 506 may form a scalar parameter from the scalar data on movement.

The portable device 100 may comprise a receiver section 500 for receiving signals from the satellites of the satellite system. The receiver section 500 may comprise an antenna 502 which receives electromagnetic radiation and a mixer 504 for mixing the radio frequency signal coming from the antenna 502 to a base band signal. The base band signal propagates to a satellite positioning sensor 400 which forms vector data on position of the user 10. The satellite positioning sensor 400 may also form scalar data on movement of the user 10.

A controller 506 receives the vector data and the potentially formed scalar data. The controller 506 may form the global coordinates in 2D or 3D and the speed and/or distance of the user. The controller 506 may have a processor and a memory, and the controller 506 may perform data and/or signal processing. The controller 506 may store the vector data such as the global coordinates in the memory.

The portable device 100 may also comprise a receiver section 508 for receiving at least one signal from at least one motion sensor. The receiver section 508 may also receive a signal from a separate satellite positioning sensor 400 of a satellite positioning system. The receiver section 508 may comprise an antenna 510, which receives electromagnetic radiation, and a mixer 512 for mixing the radio frequency signal coming from the antenna 510 to a base band signal. The base band signal propagates to a controller 506 where the speed and or traveled distance of the user may be determined. The position of the user may also be determined if the receiver section 508 also receives data based on signals from the satellite system. If the satellite positioning sensor 400 and the at least one sensor process the signals and/or data from the satellites into a suitable form, the controller 506 may not necessarily need to process the signals and/or data any further but the controller 506 may select the data on signals of either the satellite system or the at least one motion sensor for the display 520.

Instead of having two receiver sections 500, 508, the portable device may have a common receiver section for signals from outside motion sensors and the satellite positioning system.

The portable device 100 may comprise a transmitter section 512 which may comprise a mixer 514 for mixing the base band signal coming from the controller 506 to a radio frequency signal. The radio frequency signal may propagate to a circulator 516 which isolates the receiver section 508 and the transmitter section 512. The circulator 516 may then pass the radio frequency signal to the antenna 510 for transmitting the signal as an electromagnetic radiation. The transmitting may take place at a frequency of about 1 GHz. The transmitter section 512 is not necessarily needed in the portable device 100.

Figure 6:
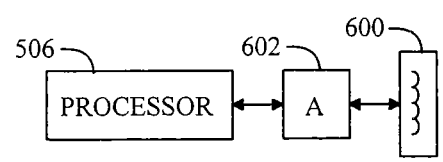
FIG. 6 illustrates a portable device with an inductive communication module.

Additionally or alternatively, the portable device 100 may communicate with at least one motion sensor and/or a positioning sensor 400 using magnetic pulses around, for example, 5 kHz as shown in FIG. 6. The magnetic pulses may be transmitted and received using a coil 600 as an antenna. During reception, the coil 600 may transform the magnetic signal into an electric signal which may be amplified in an amplifier 602. During transmission, an electrical data signal may be fed from the controller 506 to the amplifier 602 which may feed the coil 600 for transmitting a magnetic signal.

Irrespective of whether the portable device 100 has the receiver section 508 for receiving signals from an outside motion sensor or not, the portable device 100 may include a motion sensor 518 from where the controller 506 may receive signals carrying scalar data on a measured motion or movement of the user. In general, there may be more than one motion sensor in the portable device 100. The motion sensor 518 may be an acceleration sensor in at least one dimension. If the portable device 100 is in the wrist of the user 10, the motion of the wrist can be measured as a cyclical variation in acceleration. The measured variation can be used to determine the speed and/or traveled distance of the body of the user in a corresponding manner with the case of the stride sensor by integrating/averaging over a predetermined time. Also the traveled distance may be determined. However, no motion sensor is necessarily needed in the portable device 100 if the portable device 100 has the receiver section 508. A clock for time information may be included in the controller 506 and/or the at least one motion sensor.

In any case, the controller 506 may simultaneously receive data on signals from a satellite positioning system and from at least one motion sensor inside or outside the portable device 100. The controller 506 may then determine a speed and/or traveled distance of the user on the basis of data on the signals, and the controller 506 may control a display 520 to display the speed and/or distance.

The controller 506 may control the display 520 to display the speed and/or traveled distance of the user on the basis of the data on at least one signal of the at least one motion sensor while receiving the data on signals from both the satellite positioning system and from the at least one motion sensor. The controller 506 may form a location of the user 10 in global coordinates from the vector data and to store the global coordinates. The controller 506 may form the scalar parameter from the scalar data from at least one motion sensor 102, 200, 202, 204, 518 and to feed the scalar parameter to the display 520.

The controller 506 may detect a failure to receive the scalar data from the at least one motion sensor. As a response to that, the controller 506 may form speed and/or distance data of the user 10 on the basis of the vector data on positions at different moments and feed the formed speed and/or distance data to the display 520. The display 520 may display the speed and/or distance.

As a response to the failure, the controller 506 may alternatively receive scalar data on movement of the user 10 from the satellite positioning sensor 400 and feed speed and/or distance data based on the satellite positioning sensor 400 to the display 520.

Hence, the portable electronic device can continue its operation by presenting the speed and/or distance of the user on the basis of data on signals from the satellite system if the portable electronic device loses the signal(s) from the motion sensor(s) whose data the movement of the user is initially based on.

Figure 7:
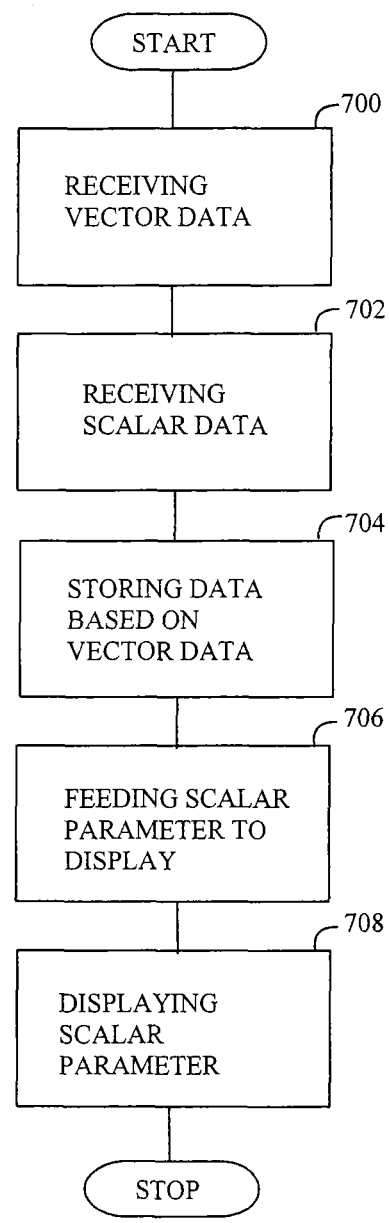
FIG. 7 illustrates a flow chart of the method.

FIG. 7 shows a flow chart of the method. In step 700, the controller 506 of a portable electronic device receives vector data on a position of a user 10 of the portable device 100 from a satellite positioning sensor 400 associated with the user 10. In step 702, the controller 506 receives scalar data on movement of the user 10 from at least one motion sensor 102, 200, 202, 204, 518 associated with the user 10. In step 704, data based on the vector data is stored in the portable device 100. In step 706, the controller 506 feeds a scalar parameter proportional to the scalar data to the display 520. In step 708, the scalar parameter is displayed by the display 520.

The method steps may be performed as a computer program and the embodiments may be implemented as a computer program comprising instructions for executing a computer process for data processing. The computer program may be run in the controller of the portable device.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A portable electronic device, the device comprising:
a controller; and
a display, the controller being configured to receive vector data representing a position of a user of the portable device from a satellite positioning sensor associated with the user, receive scalar data representing movement of the user from at least one motion sensor associated with the user, store data based on the vector data, and feed a scalar parameter proportional to the scalar data to the display, the display being configured to display the scalar parameter, the vector data comprising satellite positioning data, the scalar data being a numerical value, the scalar parameter proportional to the scalar data comprising at least one of an average speed, an instantaneous speed, and a distance traveled along a path of the user, the controller being configured to detect a failure to receive the scalar data from the at least one motion sensor, form the scalar parameter on the basis of the vector data on position, and feed the scalar parameter to the display in response to the failure.

2. The portable electronic device of claim 1, wherein the controller is configured to form a location of the user in global coordinates from the vector data and to store the global coordinates.

3. The portable electronic device of claim 1, wherein the controller is configured to form the scalar parameter from the scalar data from at least one motion sensor and to feed the scalar parameter to the display.

4. The portable electronic device of claim 1, wherein the controller is configured to receive the scalar data from at least one of the following: a stride sensor, a bike sensor, each of which acting as a motion sensor.

5. A portable electronic device, the device comprising:
a controller; and
a display, the controller being configured to receive vector data representing a position of a user of the portable device from a satellite positioning sensor associated with the user, receive scalar data representing movement of the user from at least one motion sensor associated with the user, store data based on the vector data, and feed a scalar parameter proportional to the scalar data to the display, the display being configured to display the scalar parameter, the vector data comprising satellite positioning data, the scalar data being a numerical value, the scalar parameter proportional to the scalar data comprising at least one of an average speed, an instantaneous speed, and a distance traveled along a path of the user, the controller being configured to detect a failure to receive scalar data from the at least one motion sensor, receive scalar data on movement of the user formed from the vector data from the satellite positioning sensor in response to the failure, and feed the scalar parameter based on the scalar data on movement of the user from the satellite positioning sensor to the display.

6. A data processing method, the method comprising:
receiving, by a controller of a portable electronic device, vector data representing a position of a user of the portable device from a satellite positioning sensor associated with the user;
receiving, by the controller, scalar data representing movement of the user from at least one motion sensor associated with the user;
storing data based on the vector data;
feeding, by the controller, a scalar parameter proportional to the scalar data to the display;
displaying the scalar parameter by the display, the vector data comprising satellite positioning data, the scalar data being a numerical value, the scalar parameter proportional to the scalar data comprising at least one of an average speed, an instantaneous speed, and a distance traveled along a path of the user;
detecting, by the controller, a failure in the reception of data from the at least one motion sensor;
forming the scalar parameter on the basis of the vector data on position in response to the failure; and
feeding the formed scalar parameter to the display and displaying the scalar parameter by the display.

7. The data processing method of claim 6, the method further comprising receiving, by the controller, the scalar data from at least one of the following: a stride sensor, a bike sensor, each of which acting as a motion sensor.

8. A data processing method, the method comprising:
receiving, by a controller of a portable electronic device, vector data representing a position of a user of the portable device from a satellite positioning sensor associated with the user;
receiving, by the controller, scalar data representing movement of the user from at least one motion sensor associated with the user;
storing data based on the vector data;
feeding, by the controller, a scalar parameter proportional to the scalar data to the display;
displaying the scalar parameter by the display, the vector data comprising satellite positioning data, the scalar data being a numerical value, the scalar parameter proportional to the scalar data comprising at least one of an average speed, an instantaneous speed, and a distance traveled along a path of the user;

detecting, by the controller, a failure to receive the scalar data from the at least one motion sensor;

receiving scalar data on movement of the user formed from the vector data from the satellite positioning sensor in response to the failure; and feeding the scalar parameter based on the scalar data from the satellite positioning sensor to the display.

9. A computer-readable storage medium comprising instructions that, when executed by a computing device, cause the computing device to:

receive vector data representing a position of a user of a portable device from a satellite positioning sensor associated with the user;

receive scalar data representing movement of the user from at least one motion sensor associated with the user;

store data based on the vector data;

feed scalar parameter proportional to the scalar data to the display for displaying the scalar parameter, the vector data comprising satellite positioning data, the scalar data being a numerical value, the scalar parameter proportional to the scalar data comprising at least one of an average speed, an instantaneous speed, and a distance traveled along a path of the user;

detect a failure in the reception of data from the at least one motion sensor;

form the scalar parameter on the basis of the vector data on position in response to the failure; and feed the formed scalar parameter to the display and displaying the scalar parameter by the display.

10. The computer-readable storage medium of claim 9, wherein the computer-readable storage medium is distributed in the form of a distribution medium including at least one of the following media: a computer readable medium, a program storage medium, a record medium, a computer readable memory, a computer readable software distribution package, a computer readable signal, a computer readable telecommunications signal, and a computer readable compressed software package.

11. A computer-readable storage medium comprising instructions that, when executed by a computing device, cause the computing device to:

receive vector data representing a position of a user of a portable device from a satellite positioning sensor associated with the user;

receive scalar data representing movement of the user from at least one motion sensor associated with the user;

store data based on the vector data;

feed scalar parameter proportional to the scalar data to the display for displaying the scalar parameter, the vector data comprising satellite positioning data, the scalar data being a numerical value, the scalar parameter proportional to the scalar data comprising at least one of an average speed, an instantaneous speed, and a distance traveled along a path of the user;

detect a failure to receive the scalar data from the at least one motion sensor;

receive scalar data on movement of the user formed from the vector data from the satellite positioning sensor in response to the failure; and feed the scalar parameter based on the scalar data from the satellite positioning sensor to the display.

\* \* \* \* \*